US012255537B2

(12) United States Patent
Kedlaya et al.

(10) Patent No.: US 12,255,537 B2
(45) Date of Patent: Mar. 18, 2025

(54) FEEDFORWARD COMPENSATION FOR LLC RESONANT CONVERTERS

(71) Applicant: Hamilton Sundstrand Corporation, Charlotte, NC (US)

(72) Inventors: Halladi Shashwatha Kumara Kedlaya, Udupi (IN); Piyush Nilchandra Waghmare, Kundalhalli (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/833,966

(22) Filed: Jun. 7, 2022

(65) Prior Publication Data

US 2022/0393602 A1 Dec. 8, 2022

(30) Foreign Application Priority Data

Jun. 7, 2021 (IN) .............................. 202141025329

(51) Int. Cl.
*H02M 3/335* (2006.01)
*H02M 1/00* (2006.01)
*H02M 3/00* (2006.01)

(52) U.S. Cl.
CPC ..... *H02M 3/33571* (2021.05); *H02M 1/0016* (2021.05); *H02M 3/01* (2021.05)

(58) Field of Classification Search
CPC ........ H02M 3/00; H02M 3/0122; H02M 3/24; H02M 3/28; H02M 3/315; H02M 3/335; H02M 3/33515; H02M 3/33523; H02M 3/33553; H02M 3/33569; H02M 3/33571; H02M 3/33573; H02M 3/33576; H02M 3/33584; H02M 3/33592; H02M 1/0003;
(Continued)

(56) References Cited

U.S. PATENT DOCUMENTS 6,593,725 B1 7/2003 Gallagher et al.
7,289,341 B2 10/2007 Hesterman
(Continued)

FOREIGN PATENT DOCUMENTS

CN 103840646 A 6/2014
CN 108448898 A 8/2018
(Continued)

OTHER PUBLICATIONS

Extended European Search Report for European Patent Application No. EP22177558.8, dated Nov. 8, 2022.
(Continued)

*Primary Examiner* — Thienvu V Tran
*Assistant Examiner* — Carlos O Rivera-Perez (57) ABSTRACT

An LLC resonant converter comprises, an LLC resonant converter circuit with an output line and an input line. The LLC resonant converter circuit includes a switch array operatively connecting between the input line and the output line. A controller is connected to the input line by a feed forward line and connected to a respective gate of each switch in the switch array. The controller includes machine readable instructions configured to cause the controller to receive feed forward input from the input line and control switching of the switch array with a pulse frequency modulation (PFM) switching pattern to regulate voltage of the output line.

20 Claims, 2 Drawing Sheets

(58) Field of Classification Search
CPC ............. H02M 1/0012; H02M 1/0016; H02M 1/0019; H02M 1/0022; H02M 1/0025; H02M 1/14; H02M 1/143; H02M 1/42; H02M 1/4241; H02M 7/217; H02M 7/219; H02M 7/4815; H02M 7/521; H02M 7/523; H02M 7/525; H02M 7/529; H02M 3/01; H02M 3/22; Y02B 70/10
USPC ............... 363/15–21.3, 40–47, 89, 131–134; 323/271–275, 280, 282–286, 351
See application file for complete search history.

(56) References Cited

U.S. PATENT DOCUMENTS

| | | | |
|---|---|---|---|
| 8,300,429 | B2 | 10/2012 | Orr et al. |
| 8,582,319 | B2 | 11/2013 | Reinberger et al. |
| 9,148,051 | B2 * | 9/2015 | Moon ................. H02M 1/4225 |
| 9,203,326 | B2 | 12/2015 | Harrison et al. |
| 10,897,205 | B2 | 1/2021 | Shen et al. |
| 2016/0373015 | A1 | 12/2016 | Deng et al. |
| 2018/0367056 | A1 * | 12/2018 | Liu ......................... H02M 7/12 |
| 2021/0096585 | A1 * | 4/2021 | Kesarwani ......... G11B 5/59627 |

FOREIGN PATENT DOCUMENTS

| | | |
|---|---|---|
| CN | 108539985 A | 9/2018 |
| CN | 109739107 A | 5/2019 |
| CN | 110855148 A | 2/2020 |
| CN | 111431416 A | 7/2020 |
| JP | 2004153978 A | 5/2004 |
| WO | WO-2013120534 A1 | 8/2013 |

OTHER PUBLICATIONS

Examination Report dated Jan. 16, 2025 in connection with European Patent Application No. 22177558.8, 6 pages.

* cited by examiner

FEEDFORWARD COMPENSATION FOR LLC RESONANT CONVERTERS

CROSS-REFERENCE TO RELATED APPLICATIONS

This application claims priority to and the benefit of Indian Provisional Patent Application No. 202141025329, filed Jun. 7, 2021, the entire content of which is incorporated herein by reference.

BACKGROUND

1. Field

The present disclosure relates generally to power converters, and more particularly to LLC resonant converters.

2. Description of Related Art

LLC resonant converters are becoming very popular as switched-mode power supplies (SMPS) in aerospace, consumer electronics, medical, telecom and many other industries. Switching frequency is varied to control the output voltage in these types of converters. Many papers have been written to state the advantages of feed-forward compensation in duty-ratio varied (or PWM) converters. Since PWM methodology is not applicable to LLC resonant converters, variable frequency method is used to regulate the output, hence, LLC converters' transient response to input disturbance is poor. However, larger output capacitors must be used to increase LLC resonant converter's ability to improve transient response to input disturbance. The extra size and weight of such capacitors is a limiting factor for applications like aerospace. There is an ongoing need to improve transient response in LLC resonant converters to surpass the requirement of large output capacitance. This disclosure provides a solution to have better transient immunity without need of large output capacitor.

SUMMARY

An LLC resonant converter comprises, an LLC resonant converter circuit with an output line and an input line. The LLC resonant converter circuit includes a switch array operatively connecting between the input line and the output line. A controller is connected to the input line by a feed forward line and connected to a respective gate of each switch in the switch array. The controller includes machine readable instructions configured to cause the controller to receive feed forward input from the input line and control switching of the switch array with a pulse frequency modulation (PFM) switching pattern to regulate voltage of the output line.

In embodiments, the machine readable instructions can be configured to take a difference of a reference voltage minus a feedback transfer function of voltage of the output line to produce an error signal. The feedback transfer function can be represented by $$H_v(s) = \frac{V_{ref}}{V_o},$$

where $V_{ref}$ is reference voltage, and $V_o$ is output voltage. In embodiments, the machine readable instructions can be configured to take a difference of a controller transfer function of the error signal minus a feed-forward compensator transfer function of voltage of the input line to make a switching frequency signal. The controller transfer function can be represented by $$C_v(s) = K_p + \frac{K_i}{s} + K_d s,$$

where $K_p$ is proportional gain, $K_i$ is integral gain, and $K_d$ is differentiator gain. The feed-forward compensator transfer function can be represented by $$F_g(s) = K\left(\frac{s}{s + w_p}\right),$$

where K is feed-forward compensator gain (Hz/V), s is complex variable (continuous time-domain) (/s), and $w_p$ is feed-forward compensator pole frequency (rad/s).

In embodiments, the machine readable instructions can be configured to sum output-voltage-to-switching-frequency transfer function of the switching frequency signal plus output-voltage-to-input-voltage transfer function f voltage of the input line plus output-voltage-to-output-current function of current of the output line to output controlled voltage to the output line.

The output-voltage-to-switching-frequency transfer function can be represented by $$G_{co}\Big|_{\substack{v_g=0;\\ i_o=0;}} = \frac{\tilde{v}_o}{\tilde{f}_s} = G_{vf}(s)$$

where $G_{co}(s)$ is control-to-output transfer function (V/Hz), $V_g$ is input voltage source (V), $i_o$ is output current source (A), $v_o$ is output voltage (V), $f_s$ is switching frequency of $Q_1$ and $Q_2$ (Hz).

The output-voltage-to-input-voltage transfer function can be represented by $$G_{lo}\Big|_{\substack{i_o=0;\\ i_c=0;}} = \frac{\tilde{v}_o}{\tilde{v}_g} = G_{vg}(s) - G_{vf}(s)F_g(s)$$

where $G_{io}(s)$ is line-to-output transfer function (V/V), $V_g$ is input voltage source (V), and $v_o$ is output voltage (V), $F_g(s)$ is the feed-forward compensator transfer function, and $G_{vf}(s)$ is the output-voltage-to-switching-frequency transfer function.

The output-voltage-to-output-current function can be represented by $$G_{oz}\Big|_{\substack{i_c=0;\\ v_g=0;}} = \frac{\tilde{v}_o}{\tilde{i}_o} = Z_{out}(s),$$

where $G_{oz}(s)$ is output-impedance function (V/A), $v_o$ is output voltage (V), and $i_o$ is output current source (A).

In embodiments, a method includes receiving feed forward input from an input line of an LLC resonant converter, controlling switching of a switch array with a pulse frequency modulation (PFM) switching pattern to regulate voltage of the output line, taking a difference of a reference voltage minus a feedback transfer function of voltage of the output line to produce an error signal, and taking a difference of a controller transfer function of the error signal minus a feed-forward compensator transfer function of voltage of the input line to make a switching frequency signal.

The method can further include, summing output-voltage-to-switching-frequency transfer function of the switching frequency signal plus output-voltage-to-input-voltage transfer function of voltage of the input line plus output-voltage-to-output-current function of current of the output line to output controlled voltage to the output line.

In embodiments, a controller can be operatively connected to the input line by a feed forward line and connected to a respective gate of each switch in the switch array, such that the controller performs the method.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
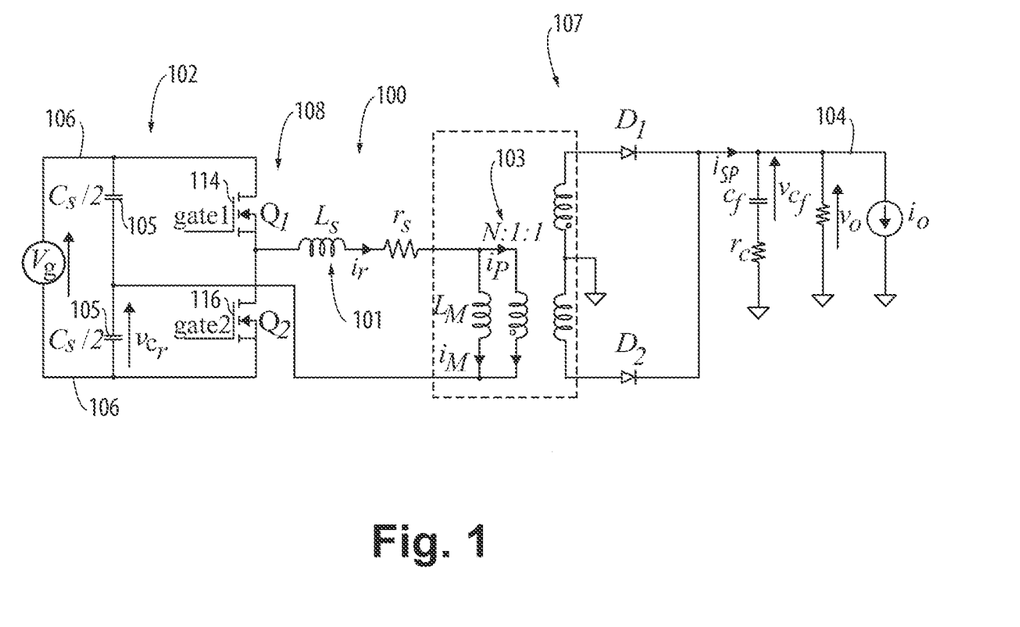
FIG. 1 is a schematic circuit diagram constructed in accordance with at least one aspect of this disclosure, showing an LLC resonant converter circuit.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to improve transient response in LLC resonant converters.

As the aerospace industry moves toward electric powered aircraft, there is a demand for high efficient power conversion. Conventional aircraft power converters use higher-efficiency and wide-range input capable LLC converters for power conversion. These systems should be immune to input voltage and load-current disturbances of aircraft. Using a feed-forward compensation along with switching frequency control in the LLC can provide improved transient response over wide-range of input voltage.

Ensuring good dynamic performance for wide input-voltage variation may be difficult to achieve in an LLC resonant converter because switching frequency is used to control the output voltage. In this way, the full advantage of LLC cannot be exploited, such as when output voltage needs to be tightly regulated (e.g. low-voltage data-center loads, medical equipment, and the like). While feed-forward control has been used in pulse-width-modulation (PWM) converters, the applicability of this technique in resonant converters is limited.

Traditionally, in order to get the same effect in LLC resonant converters (e.g. reducing overshoot and undershoot in output voltage to increase the output filter capacitance) required large capacitors, which increase the size and weight of the converter, as well as overall cost. However, using feed-forward compensation as described herein, output capacitor value can be sufficient to meet the ripple voltage requirement while still maintaining transient performance.

With this technique, higher input voltage disturbance rejection can be obtained in the LLC resonant converter, so that the overshoot and undershoot in output voltage (which can occur due to sudden change in input voltage) can be minimized. The systems and methods as described herein therefore illustrate an effective and novel use of feed-forward compensation for input voltage in LLC resonant converters to achieve better dynamic response to input voltage disturbance.

While the systems and methods presented herein are described with respect to electric aircraft for example, it is contemplated that this technique may be used in any wide-input LLC resonant converter, or in any application where output voltage needs to be tightly regulated.

With the help of equations shown below, and the diagrams presented in the Figures, it possible to obtain the value of line-to-output transfer function for a half-bridge LLC resonant converter (e.g. as shown). Inclusion of feed-forward term should only act during the transient and not affect the DC value of the output voltage. To ensure this, compensator $F_g(S)$ should be of differentiator type. Additionally, because a differentiator may amplify high frequency noise, a pole should also be placed. Pole frequency can be determined based on speed of response and noise attenuation required. Any suitable number of poles and zeros can be placed in the system as needed without departing from the scope of this disclosure.

The described feed-forward technique used to improve transient response of the LLC is shown in FIG. 1. The LLC resonant converter includes two inductors 101, 103 and a capacitor 105 as part of the tank circuit 102. When input voltage or load current changes, switching frequency is varied to vary tank impedance and maintain output voltage from the tank circuit 102 constant. For high efficiency, resonant converters are operated close to resonant frequency. The converter can provide normalized gain higher than one while still operating in ZVS (zero voltage switching) region. This makes it a preferred choice for applications where wide-input voltage variation is present.

The LLC resonant converter 100 includes an LLC resonant converter circuit 107 with an output line 104 and an input line 106. The LLC resonant converter circuit 107 includes a switch array 108 operatively connecting between the input line 106 and the output line 104. Any other suitable LLC circuit components may be included as needed for a specific application. For example, the tank circuit 102 and/or resonant converter circuit 107 may include any number or combination of capacitors, inductors, resistors, transformers, and/or diodes as needed or desired. A controller 110 is connected to the input line 106 by a feed forward line 112 (e.g. as shown in FIG. 2) and connected to a respective gate 114, 116 of each switch in the switch array 108.

Figure 2:
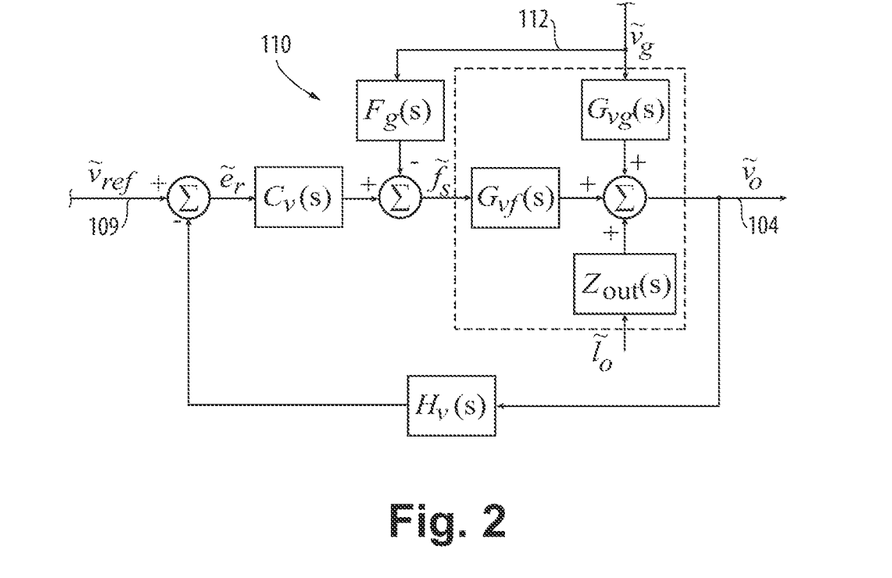
FIG. 2 is a schematic logic diagram of an embodiment of a feed-forward control scheme for controlling the LLC resonant converter of FIG. 1.
Figure 3:
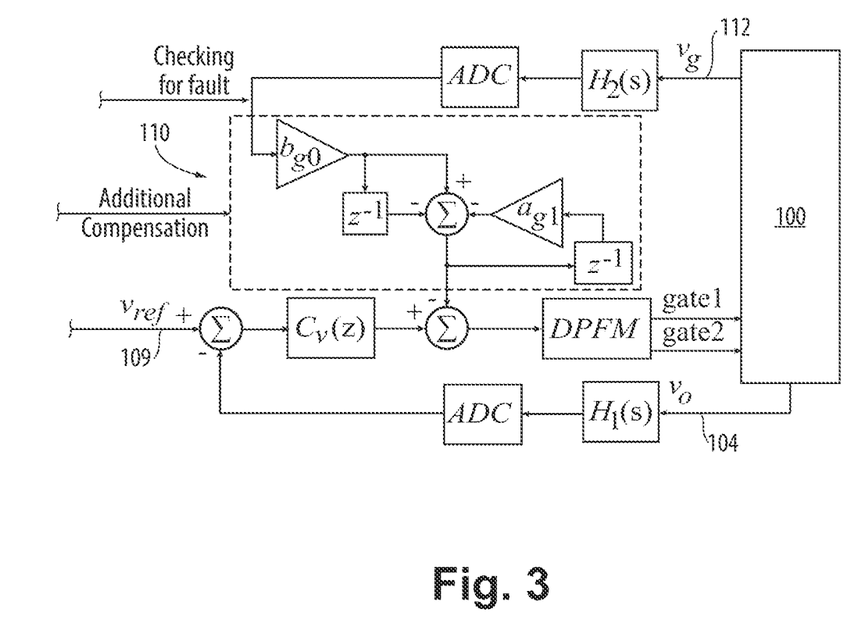
FIG. 3 is a schematic logic/circuit diagram of a controller including the feed-forward control scheme of FIG. 2, showing the connections between the controller and an LLC resonant converter circuit.

In the feed-forward system as shown and described, for example as shown in FIGS. 2-3 (where FIG. 2 shows the logic and FIG. 3 shows the circuit implementation of the logic shown in FIG. 2), the controller 110 includes machine readable instructions configured to cause the controller 110 to perform a method. The method can include receiving feed forward input from the feed forward line 112 and controlling switching of the switch array 108 with a pulse frequency modulation (PFM) switching pattern to regulate voltage of the output line 104.

The method includes taking a difference of a reference voltage 109 (e.g. $v_{ref}$) minus a feedback transfer function (e.g. $H_v(s)$) of voltage of the output line 104 to produce to make an error signal (e.g. $e_r$). The feedback transfer function can be represented by $$H_v(s) = \frac{V_{ref}}{V_o},$$

where $V_{ref}$ is reference voltage, and $V_o$ is output voltage.

The method can also include taking a difference of a controller transfer function (e.g. $C_v(s)$) of the error signal minus a feed-forward compensator transfer function (e.g. $F_g(s)$) of voltage of the feed forward line 112 to make a switching frequency signal $f_s$. The controller transfer function can be represented by $$C_v(s) = K_p + \frac{K_i}{s} + K_d s,$$

where $K_p$ is proportional gain, $K_i$ is integral gain, and $K_d$ is differentiator gain.

The method can further include, summing output-voltage-to-switching-frequency transfer function (e.g. $G_{vf}(s)$) of the switching frequency signal (e.g. $f_s$) plus output-voltage-to-input-voltage transfer function (e.g. $G_{vg}(s)$) of voltage of the feed forward line 112 (e.g. $V_g$) plus output-voltage-to-output-current function (e.g. $Z_{out}(s)$) of current of the output line 104 (e.g. $i_o$) to output controlled voltage to the output line 104.

The output-voltage-to-switching-frequency transfer function can be represented by, $$G_{co}\Big|_{\substack{\tilde{v}_g=0;\\ \tilde{i}_o=0;}} = \frac{\tilde{v}_o}{\tilde{f}_s} = G_{vf}(s)$$

where $G_{co}(s)$ is control-to-output transfer function (V/Hz), $V_g$ is input voltage source (V), $i_o$ is output current source (A), $v_o$ is output voltage (V), $f_s$ is switching frequency of $Q_1$ and $Q_2$ (Hz).

The output-voltage-to-input-voltage transfer function can be represented by, by $$G_{lo}\Big|_{\substack{\tilde{i}_o=0;\\ \tilde{i}_c=0;}} = \frac{\tilde{v}_o}{\tilde{v}_g} = G_{vg}(s) - G_{vf}(s)F_g(s)$$

where $G_{oz}(s)$ is line-to-output transfer function (V/V), $V_g$ is input voltage source (V), and $v_o$ is output voltage (V), $F_g(s)$ is the feed-forward compensator transfer function, and $G_{vf}(s)$ is the output-voltage-to-switching-frequency transfer function.

The output-voltage-to-output-current function can be represented by, $$G_{oz}\Big|_{\substack{\tilde{i}_c=0;\\ \tilde{v}_g=0;}} = \frac{\tilde{v}_o}{\tilde{i}_o} = Z_{out}(s)$$

where $G_{oz}(s)$ is output-impedance function (V/A), $v_o$ is output voltage (V), and $i_o$ is output current source (A).

The feed-forward compensator transfer function can be represented by, $$F_g(s) = K\left(\frac{s}{s+w_p}\right)$$

where K is feed-forward compensator gain (Hz/V), s is complex variable (continuous time-domain) (/s), and $w_p$ is feed-forward compensator pole frequency (rad/s). To implement this compensation in the controller 110 (e.g. DSP or FPGA or the like) which can be used for PWM or PFM generation and control techniques, first one needs to convert $F_g(s)$ in to discrete time-domain, as shown below.

$$F_g(s) = K\left(\frac{s}{s+w_p}\right) \Longrightarrow F_g(z) = \frac{\left(\frac{2K}{w_pT_s+2}\right)(1-z^{-1})}{1+\left(\frac{w_pT_s-2}{w_pT_s+2}\right)z^{-1}} = \frac{b_{go}(1-z^{-1})}{1+a_{g1}z^{-1}};$$

where: $T_s$ = sampling period of ADC $$b_{go} = \frac{2K}{w_pT_s+2}; a_{g1} = \frac{w_pT_s-2}{w_pT_s+2}$$

Bilinear or Tustin transformation can be used to convert compensation from continuous time to discrete time. For example, input voltage will be sensed for computing the correction on the output of main control path. The amount of correction to be applied will be based on the equation shown above. Sudden change in input voltage can lead to transient spike in output voltage and can be detrimental to the converter performance. Therefore, the correction can be applied in case a sudden change in input voltage. In certain instances, for example when there is a change in DC, no correction is applied, ensuring that output voltage does not shift from required value. This loop will not affect the steady-state performance of LLC.

The detailed flow for this implementation is shown in FIG. 3, where ADC is an analog-to-digital converter and DPFM is a PFM in digital domain, $H_1$ (s) is output-voltage sensor (V/V) and filter transfer function and $H_2$ (s) is input-voltage sensor and filter transfer function (V/V). $F_g$ (s), the feed-forward compensator transfer function, is broken down into components in the dashed box, where $b_{g_0}$ is constant gain 1, (Hz/V), $a_{g_1}$ is constant gain 1, and $z^{-1}$ is the inverse complex variable (discrete time domain) as shown in the equation above. To further validate the improvement in transient response simulation, results show that it is clear that feed-forward control helps in reducing the overshoot and undershoot arising due to sudden change in the input voltage, proving advantageous for critical loads which cannot tolerate sudden jump in output voltage. Comparison of bode plots for the case without and with the compensation confirms the reduction in magnitude of line-to-output transfer function, meaning that deviation in output voltage due to change in input voltage will be reduced. Though implementation as described herein is related to digital platforms, it is contemplated herein that the control scheme can also be implemented using analog integrated circuits.

The methods and systems of the present disclosure, as described above and shown in the drawings, provide for a number of improvements on conventional LLC control. For example, use of feed-forward compensation with PFM improves transient response (e.g. faster response with critical loads), reduces output capacitors size (e.g. increasing power density), and minimizes the effects of sudden change in input voltage on output voltage (e.g. transient immunity). This allows for better performance overall of the converter and allows for easy implementation in controller types such as FPGA/DSP as compared to traditional PWM integrated circuit. Better dynamic performance provides for use in multiple products as well as with a variety of critical loads without changing hardware. For example there may be no need to change or include additional output filter elements such as inductors and capacitors when incorporating this technique across products.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, Python, C++ or the like and conventional procedural programming languages, such as the "C" programming language, VHDL, Verilog or similar programming languages. The program code may execute entirely on the user's computer, partly on the user's computer, as a stand-alone software package, partly on the user's computer and partly on a remote computer or entirely on the remote computer or server. In the latter scenario, the remote computer may or may not be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

While the apparatus and methods of the subject disclosure have been shown and described, those skilled in the art will readily appreciate that changes and/or modifications may be made thereto without departing from the scope of the subject disclosure.

What is claimed is:

1. An LLC resonant converter comprising:
an LLC resonant converter circuit comprising:
an output line;
an input line;
first and second capacitors coupled in series, the first capacitor coupled to the input line;
first and second switches coupled in series, the first switch coupled to the input line, the first and second switches forming a switch array operatively connected between the input line and the output line; and
first and second inductors coupled in series, the first inductor coupled between the first and second switches, the second inductor coupled between the first and second capacitors; and
a controller connected to the input line by a feed-forward line and connected to a respective gate of each of the first and second switches, wherein the controller includes machine readable instructions configured to cause the controller to:
receive feed-forward input from the input line and control switching of the switch array with a pulse frequency modulation (PFM) switching pattern to regulate an output voltage of the output line;
take a difference of a reference voltage minus a feedback transfer function of the output voltage of the output line to produce an error signal, wherein the feedback transfer function is expressed as $$H_v(s) = \frac{V_{ref}}{V_o},$$

where $V_{ref}$ is the reference voltage and $V_o$ is the output voltage; and
take a difference of a controller transfer function of the error signal minus a feed-forward compensator transfer function of an input voltage of the input line to produce a switching frequency signal, wherein the feed-forward compensator transfer function is expressed as $$F_g(s) = K\left(\frac{s}{s + w_p}\right),$$

where K is a feed-forward compensator gain, s is a complex variable (continuous time-domain), and $w_p$ is a feed-forward compensator pole frequency.

2. The LLC resonant converter as recited in claim 1, wherein the controller transfer function is expressed as $$C_v(s) = K_p + \frac{K_i}{s} + K_d s,$$

where $K_p$ is a proportional gain, $K_i$ is an integral gain, and $K_d$ is a differentiator gain.

3. The LLC resonant converter as recited in claim 1, wherein the machine readable instructions are further configured to cause the controller to:
sum an output-voltage-to-switching-frequency transfer function of the switching frequency signal plus an output-voltage-to-input-voltage transfer function of the input voltage of the input line plus an output-voltage-to-output-current function of an output current of the output line.

4. The LLC resonant converter as recited in claim 3, wherein the output-voltage-to-switching-frequency transfer function is expressed as $$G_{co}\big|_{\substack{\tilde{v}_g=0; \\ \tilde{i}_o=0;}} = \frac{\tilde{v}_o}{\tilde{f}_s} = G_{vf}(s),$$

where $G_{co}(s)$ is a line-to-output transfer function (V/V), $V_g$ is the input voltage (V), $i_o$ is the output current (A), $v_o$ is the output voltage (V), and $f_s$ is a switching frequency of the first and second switches (Hz).

5. The LLC resonant converter as recited in claim 3, wherein the output-voltage-to-input-voltage transfer function is expressed as $$G_{io}|_{\substack{\tilde{i}_o=0;\\ \tilde{i}_c=0;}} = \frac{\tilde{v}_o}{\tilde{v}_g} = G_{vg}(s) - G_{vf}(s)F_g(s),$$

where $G_{Io}(s)$ is a line-to-output transfer function (V/V), $V_g$ is the input voltage (V), $v_o$ is the output voltage (V), $F_g(s)$ is the feed-forward compensator transfer function, and $G_{vf}(s)$ is the output-voltage-to-switching-frequency transfer function.

6. The LLC resonant converter as recited in claim 3, wherein the output-voltage-to-output-current function is expressed as $$G_{oz}|_{\substack{\tilde{i}_c=0;\\ \tilde{v}_g=0;}} = \frac{\tilde{v}_o}{\tilde{i}_o} = Z_{out}(s),$$

where $G_{oz}(s)$ is an output-impedance function (V/A), $v_o$ is the output voltage (V), and $i_o$ is the output current (A).

7. The LLC resonant converter of claim 1, wherein the controller is configured to provide a normalized gain at the output line greater than one while still operating in a zero-voltage switching (ZVS) region.

8. A method comprising:
receiving feed-forward input from an input line of an LLC resonant converter comprising an LLC resonant converter circuit, the LLC resonant converter circuit comprising the input line, an output line, first and second capacitors coupled in series where the first capacitor is coupled to the input line, first and second switches coupled in series where the first switch is coupled to the input line and the first and second switches form a switch array operatively connected between the input line and the output line, and first and second inductors coupled in series where the first inductor is coupled between the first and second switches and the second inductor is coupled between the first and second capacitors;
controlling switching of the switch array with a pulse frequency modulation (PFM) switching pattern to regulate an output voltage of the output line;
taking a difference of a reference voltage minus a feedback transfer function of the output voltage of the output line to produce an error signal; and
taking a difference of a controller transfer function of the error signal minus a feed-forward compensator transfer function of an input voltage of the input line to produce a switching frequency signal, wherein the feedback transfer function is expressed as $$H_v(s) = \frac{V_{ref}}{V_o},$$

where $V_{ref}$ is the reference voltage and $V_o$ is the output voltage, wherein the feed-forward compensator transfer function is expressed as $$F_g(s) = K\left(\frac{s}{s+w_p}\right),$$

where K is a feed-forward compensator gain, s is a complex variable (continuous time-domain), and $w_p$ is a feed-forward compensator pole frequency.

9. The method as recited in claim 8, further comprising:
summing an output-voltage-to-switching-frequency transfer function of the switching frequency signal plus an output-voltage-to-input-voltage transfer function of the input voltage of the input line plus an output-voltage-to-output-current function of an output current of the output line.

10. The method as recited in claim 9, wherein the controller transfer function is expressed as $$C_v(s) = K_p + \frac{K_i}{s} + K_d s,$$

where $K_p$ is a proportional gain, $K_i$ is an integral gain, and $K_d$ is a differentiator gain.

11. The method as recited in claim 9, wherein the output-voltage-to-switching-frequency transfer function is expressed as $$G_{co}|_{\substack{\tilde{v}_g=0;\\ \tilde{i}_o=0;}} = \frac{\tilde{v}_o}{\tilde{f}_s} = G_{vf}(s),$$

where $G_{co}(s)$ is a control-to-output transfer function (V/Hz), $V_g$ is the input voltage (V), $i_o$ is the output current (A), $v_o$ is the output voltage (V), and $f_s$ is a switching frequency of the first and second switches (Hz).

12. The method as recited in claim 9, wherein the output-voltage-to-input-voltage transfer function is expressed as $$G_{io}|_{\substack{\tilde{i}_o=0;\\ \tilde{i}_c=0;}} = \frac{\tilde{v}_o}{\tilde{v}_g} = G_{vg}(s) - G_{vf}(s)F_g(s),$$

where $G_{Io}(s)$ is a line-to-output transfer function (V/V), $V_g$ is the input voltage (V), $V_o$ is the output voltage (V), $F_g(s)$ is the feed-forward compensator transfer function, and $G_{vf}(s)$ is the output-voltage-to-switching-frequency transfer function.

13. The method as recited in claim 9, wherein the output-voltage-to-output-current function is, $$G_{oz}|_{\substack{\tilde{i}_c=0;\\ \tilde{v}_g=0;}} = \frac{\tilde{v}_o}{\tilde{i}_o} = Z_{out}(s),$$

where $G_{oz}(s)$ is an output-impedance function (V/A), $v_o$ is the output voltage (V), and $i_o$ is the output current (A).

14. The method as recited in claim 8, wherein a controller is operatively connected to the input line by a feed-forward line and connected to a respective gate of each of the first and second switches, wherein the controller performs the method.

15. The method of claim 8, further comprising:
providing a normalized gain at the output line greater than one while still operating in a zero-voltage switching (ZVS) region.

16. A non-transitory machine readable medium containing instructions that when executed cause a controller to:
- receive feed-forward input from an input line of an LLC resonant converter comprising an LLC resonant converter circuit, the LLC resonant converter circuit comprising the input line, an output line, first and second capacitors coupled in series where the first capacitor is coupled to the input line, first and second switches coupled in series where the first switch is coupled to the input line and the first and second switches form a switch array operatively connected between the input line and the output line, and first and second inductors coupled in series where the first inductor is coupled between the first and second switches and the second inductor is coupled between the first and second capacitors;
- control switching of the switch array with a pulse frequency modulation (PFM) switching pattern to regulate an output voltage of the output line;
- take a difference of a reference voltage minus a feedback transfer function of the output voltage of the output line to produce an error signal; and
- take a difference of a controller transfer function of the error signal minus a feed-forward compensator transfer function of an input voltage of the input line to produce a switching frequency signal, wherein the feedback transfer function is expressed as $$H_v(s) = \frac{V_{ref}}{V_o},$$

where $V_{ref}$ is the reference voltage and $V_o$ is the output voltage, wherein the feed-forward compensator transfer function is expressed as $$F_g(s) = K\left(\frac{s}{s+w_p}\right),$$

where K is a feed-forward compensator gain, s is a complex variable (continuous time-domain), and $w_p$ is a feed-forward compensator pole frequency.

17. The non-transitory machine readable medium as recited in claim 16, further containing instructions that when executed cause the controller to:
- sum an output-voltage-to-switching-frequency transfer function of the switching frequency signal plus an output-voltage-to-input-voltage transfer function of the input voltage of the input line plus an output-voltage-to-output-current function of an output current of the output line.

18. The non-transitory machine readable medium as recited in claim 17, wherein the controller transfer function is expressed as $$C_v(s) = K_p + \frac{K_i}{s} + K_d s,$$

where $K_p$ is a proportional gain, $K_i$ is an integral gain, and $K_d$ is a differentiator gain.

19. The non-transitory machine readable medium as recited in claim 17, wherein:
- the output-voltage-to-switching-frequency transfer function is expressed as $$G_{co}|\tilde{v}_g = 0; \atop \tilde{i}_o=0; = \frac{\tilde{v}_o}{\tilde{f}_s} = G_{vf}(s);$$

the output-voltage-to-input-voltage transfer function is expressed as $$G_{lo}|\tilde{i}_o = 0; \atop \tilde{i}_c=0; = \frac{\tilde{v}_o}{\tilde{v}_g} = G_{vg}(s) - G_{vf}(s)F_g(s);$$

and the output-voltage-to-output-current function is, $$G_{oz}|\tilde{i}_c = 0; \atop \tilde{v}_g=0; = \frac{\tilde{v}_o}{\tilde{i}_o} = Z_{out}(s);$$

where $G_{co}(s)$ is a control-to-output transfer function (V/Hz), $G_{lo}(s)$ is a line-to-output transfer function (V/V), $G_{oz}(s)$ is an output-impedance function (V/A), $V_g$ is the input voltage (V), $i_o$ is the output current (A), $v_o$ is the output voltage (V), $f_s$ is a switching frequency of the first and second switches (Hz), $F_g(s)$ is the feed-forward compensator transfer function, and $G_{vf}(s)$ is the output-voltage-to-switching-frequency transfer function.

20. The non-transitory machine readable medium of claim 16, further containing instructions that when executed cause the controller to provide a normalized gain at the output line greater than one while still operating in a zero-voltage switching (ZVS) region.

* * * * *